J. H. L. Tuck,
Rock-Drill Chuck.

N°49,177. Patented Aug. 1, 1865.

Witnesses

Inventor

UNITED STATES PATENT OFFICE.

J. H. L. TUCK, OF CAMBRIDGE, OHIO.

IMPROVEMENT IN DRILLS FOR WELLS.

Specification forming part of Letters Patent No. 49,177, dated August 1, 1865.

*To all whom it may concern:*

Be it known that I, J. H. L. TUCK, of Cambridge, in the county of Guernsey and State of Ohio, have invented a new and useful Improvement in Drills for Boring Oil and other Wells; and I do hereby declare that the following is a full, clear, and exact description thereof, which will enable others skilled in the art to make and use the same, reference being had to the accompanying drawings, forming part of this specification, in which—

Figure 1:
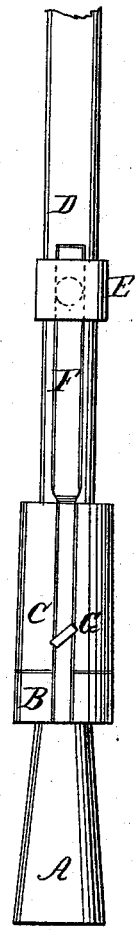
Figure 2:
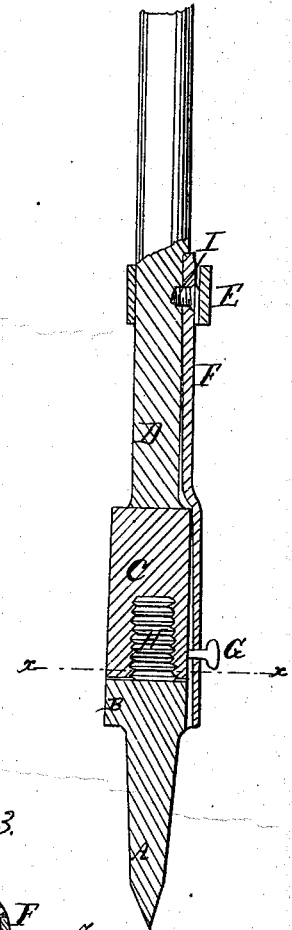
Figure 3:
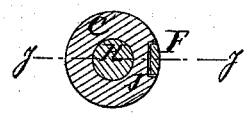

Figure 1 is an elevation of a drill and its connections made according to my invention. Fig. 2 is an elevation, partly in section, taken on the line $y\ y$ of Fig. 3. Fig. 3 is a cross-section taken on the line $x$ of Fig. 2.

Similar letters of reference indicate like parts.

This invention has for its object to prevent the drill from working loose from the shaft or drill-rod and becoming detached while boring wells or other openings in rock; and it consists in locking them together by means of a bar which articulates with a groove made in the collar or stock of the drill, so as to prevent the drill from having rotary movement on the drill-rod.

A designates a drill, and D a drill-rod, for use in boring wells or other openings in rock.

The drill may be of any shape and construction, since my invention does not relate to the construction of the cutting-face of the drill.

The drill is attached to the drill-rod by means of a screw, H, formed on the upper end of the drill-stock B, and which screws into a socket, C, formed in the enlarged lower end of the drill-rod.

J designates a groove cut on the outside of the enlarged part or socket of the drill-rod, parallel with its axis, the said groove being continued also on the periphery of the stock of the drill, so that when the latter is screwed up into its socket the groove in both shall be continuous. This groove receives a spring-bar, F, whose upper end is secured in any proper manner to the side of the drill-rod above, and whose length is such as to extend to the end of the groove in the drill-stock, as seen in the drawings. By this means I prevent the drill from working loose from the socket and becoming detached, the spring-bar F, in conjunction with the groove of the outside of the socket and drill-stock, serving to lock the latter together while they are subjected to the violent jars which follow the operation of boring the rock.

In order to prevent the screw-fastening I, by which the shank of the spring-bar is secured to the drill-rod, from working loose, I slip over the rod a loose collar, E, which is so formed, in conjunction with the shape given to the drill-rod and bar at that point, as not to be capable of descending any lower than the place of the screw.

The lower part of the spring-bar has a screw-topped hole made through it, through which a thumb-screw, G, works, in order by its means to raise the bar out of the groove of the drill-stock when it is desired to remove the drill from the socket C. When the drill is in use the thumb-screw is of course withdrawn.

This invention applies equally well to locking other tools to their shafts or rods.

I claim as new and desire to secure by Letters Patent—

Locking drills for boring oil or other wells to their rods or shafts, substantially as and for the purpose above described.

J. H. L. TUCK.

Witnesses:
  MONS SARCHET,
  E. C. RIGGS.